Feb. 20, 1962     A. MAZEIKA     3,022,095
ANCHORS FOR USE IN CONNECTION WITH SIGNAL HOSE
Filed Dec. 16, 1958

INVENTOR.
ALBERT MAZEIKA
BY Threedy & Threedy
HIS ATTORNEYS.

3,022,095
Patented Feb. 20, 1962

3,022,095
ANCHORS FOR USE IN CONNECTION WITH SIGNAL HOSE
Albert Mazeika, Chicago, Ill., assignor to Milton Manufacturing Co., Inc., Chicago, Ill., a corporation of Illinois
Filed Dec. 16, 1958, Ser. No. 780,841
1 Claim. (Cl. 285—45)

This invention relates to new and useful improvements in anchors for use in connection with signal hose, the latter used to actuate a signal when an automobile or other vehicle passes thereover.

In connection with the use of a hose for actuating a signal when an automobile or other vehicle passes thereover it has been found that the hose has a tendency to creep or roll each time the vehicle passes thereover, with the result that eventually the hose is out of proper location, resulting in failure to actuate the signal.

It is an object of this invention to provide an anchor which may be connected at the outer end of the hose or that end opposite the signal, for anchoring the hose in place to restrain it from creeping or rolling whenever an automobile passes over the hose.

A still further object of the invention is to provide an anchor which may be utilized for the above stated purpose and which also may serve as a coupler or splicer for connecting adjacent end portions of the signal hose together without obstructing passage therethrough.

Yet another and equally important object of the invention is a combination anchor and coupler or splicer for a signal hose in which the passage through the anchor may be plugged so as to utilize the anchor for connection with the end of the signal hose opposite the signal.

Another object of the invention is to provide an anchor of the class hereinafter described which is of sufficient weight to prevent creeping or rolling of the hose each time an automobile passes thereover and which is of a height that will in no way interfere with the movement of such vehicle in the event of a wheel or wheels thereof passing over the anchor.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
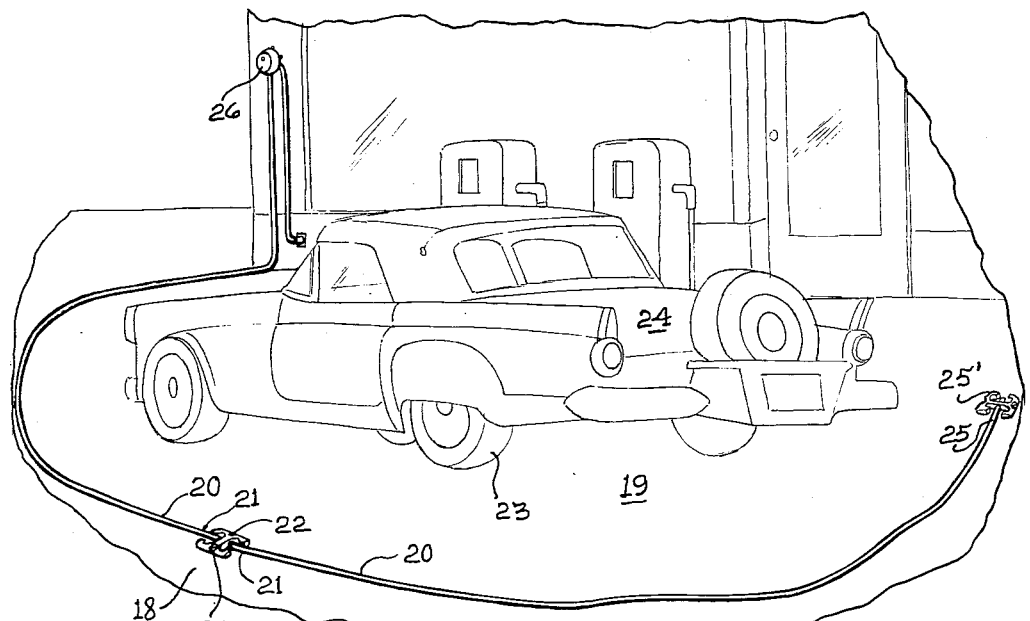
FIG. 1 is a perspective view of a gasoline filling station having a signal hose and a driveway signal, showing the employment of my improved anchor.
Figure 2:
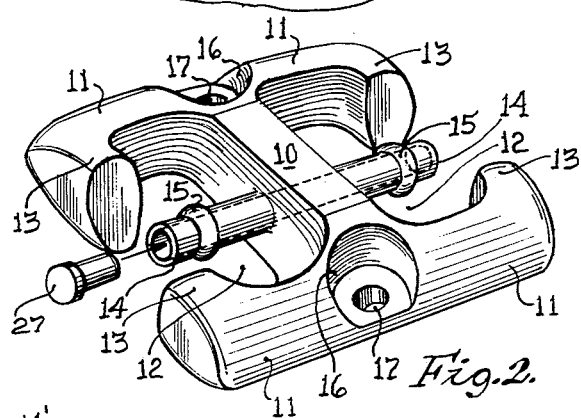
FIG. 2 is a perspective view of my improved anchor which may be utilized as a coupler or splicer or for connection to the end of a hose opposite the signal.

Referring particularly to FIG. 2, my improved anchor comprises a crossbar 10 having at opposite end portions transversely extending arms 11 forming together with the crossbar 10 oppositely disposed open slots 12.

The arms 11 are tapered outwardly to provide parallel surfaces which merge into the top portions 13 thereof. Extending from opposite sides of the crossbar 10 are nipples 14 hollow in construction and communicating with each other. Embracing the outer end portions of the nipples 14 are rings or ribs 15.

Formed in the arms 11 on opposite sides of the crossbar 10 are counterbores 16 for the reception of the heads of anchoring bolts (not shown), the shanks of which are projected through openings 17 and driven or otherwise fixed into the bed 18 of the driveway 19.

In using the form shown in FIG. 2 as a coupler or splicer for the hose 20, the opposite end portions 21 of the hose are fitted over the nipples 14, the rings or ribs 15 serving to frictionally hold the end portions 21 of the hose upon the nipples. When thus applied, the anchor may, if required, be bolted as at 22 to the bed 18, or it may be made of such weight as will enable it to retain its position upon the driveway 19 and prevent the hose 20 from creeping or rolling by reason of the passage of the wheels 23 of the vehicle 24 thereover.

When used at the end 25 of the hose 20 opposite the signal 26, the end 25 of the hose is pressed upon one of the nipples 14. A plug 27 is then fitted into the other of the nipples, thus plugging the end of the hose and preventing the escape of air therefrom whenever the wheels of the automobile pass over the hose. The anchor at the end of the hose 20 may be positioned most conveniently upon the driveway 19 so as to extend the hose across the path to be taken by the automobiles or other vehicles. In some instances it is not necessary to employ two anchors whenever there is no split hose and I have found that the anchor at the end of the hose will in a large measure serve to prevent creeping or rolling of the hose over the driveway 19.

Figure 3:
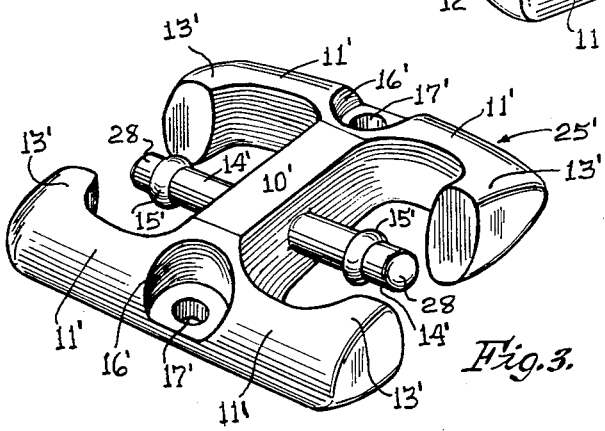
FIG. 3 is a perspective view of an anchor similar to that shown in FIG. 1, designed especially for use at the end of the hose opposite the signal.

In the form shown in FIG. 3, the anchor 25' is substantially the same as that shown in FIG. 2 and similar parts will be designated by similar reference numerals. In the form shown in FIG. 3, the nipples 28 are solid. The anchor shown in FIG. 3 is especially adapted for use in plugging up the end 25 of the hose and for retaining the hose in a fixed position across the path which the vehicle normally will take. If desired, the under surface of the anchor may be roughened or knurled so as to increase its resistance to movement when not fastened to the driveway by bolts, when the wheels of the vehicle pass over the hose.

While I have shown the anchor substantially rectangular in plan view, it is understood that it may take other forms.

The walls of the anchor arms 11 serve to permit the automobile wheels to pass thereover without effecting movement of the anchor from its position of location.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A signal hose anchor comprising a body the underside of which is substantially flat so as to lie in a substantially flat plane, said body providing an elevated flat crossbar, arms extending laterally in opposite directions from opposite ends of said crossbar with each pair of arms on each of the opposite ends of said crossbar having their upper surfaces beveled downwardly and outwardly in opposite directions until the outer edges thereof lie in the same substantially flat plane with respect to said body, each of said arms having their outer ends turned inwardly in the direction of each other to provide therebetween an open slot, a nipple on opposite sides of the crossbar extending in a parallel direction with respect to said arms into said slot and terminating short of the ends of the inwardly extending ends thereof, said nipples having open communication therebetween and adapted to be inserted in the ends of a hose, said arms intermediate the ends thereof having counterbores communicating with openings formed in said arms for the passage therethrough of an anchoring element.

References Cited in the file of this patent

UNITED STATES PATENTS

| | | |
|---|---|---|
| 185,075 | Clapp | Dec. 5, 1876 |
| 584,804 | Winton | June 22, 1897 |
| 1,166,059 | Ledbetter | Dec. 28, 1915 |
| 1,355,862 | Spellman | Oct. 19, 1920 |
| 1,759,803 | Pysher | May 20, 1930 |
| 1,910,765 | Hanlan | May 23, 1933 |
| 2,574,655 | Panofsky | Nov. 13, 1951 |